US011006007B2

(12) United States Patent
Onishi

(10) Patent No.: US 11,006,007 B2
(45) Date of Patent: May 11, 2021

(54) CONTROL SYSTEM, SERVER SYSTEM, AND CONTROL METHOD

(71) Applicant: CANON KABUSHIKI KAISHA, Tokyo (JP)

(72) Inventor: Kohei Onishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/784,093

(22) Filed: Feb. 6, 2020

(65) Prior Publication Data

US 2020/0280646 A1 Sep. 3, 2020

(30) Foreign Application Priority Data

Feb. 28, 2019 (JP) .............................. JP2019-036833

(51) Int. Cl.
*G06F 15/00* (2006.01)
*G06F 3/12* (2006.01)
*G06K 1/00* (2006.01)
*H04N 1/00* (2006.01)
*G05B 15/02* (2006.01)

(52) U.S. Cl.
CPC ......... *H04N 1/00403* (2013.01); *G05B 15/02* (2013.01); *G06F 3/1204* (2013.01); *G06F 3/1257* (2013.01); *G06F 3/1288* (2013.01)

(58) Field of Classification Search
CPC .. H04N 1/00403; G05B 15/02; G06F 3/1204; G06F 3/1257; G06F 3/1288

USPC .............................. 358/1.13, 1.15, 1.1, 1.14
See application file for complete search history.

(56) References Cited

U.S. PATENT DOCUMENTS

| 10,708,448 | B2* | 7/2020 | Shiga .................. H04N 1/00962 |
| 2018/0285037 | A1* | 10/2018 | Yoshimura ............ G06F 3/1224 |
| 2020/0195803 | A1* | 6/2020 | Kobayashi .............. G10L 15/22 |
| 2020/0267268 | A1* | 8/2020 | Yokoyama ........... G03G 15/502 |
| 2020/0272383 | A1* | 8/2020 | Kusumoto ......... H04N 1/00403 |

FOREIGN PATENT DOCUMENTS

JP        2006-301964 A        11/2006

* cited by examiner

*Primary Examiner* — Douglas Q Tran
(74) *Attorney, Agent, or Firm* — Canon U.S.A., Inc., IP Division

(57) ABSTRACT

A control system includes at least one server, and a printing apparatus, wherein the at least one server includes an identification unit configured to, in a case where a voice control device is given a print instruction by voice, identify image data to be printed based on voice data output from the voice control device, and a call unit configured to, based on user information identified based on the voice data output from the voice control device, call a print setting associated with the identified user information, wherein print data is generated based on the image data identified by the identification unit and the print setting called by the call unit, and wherein the printing apparatus is configured to perform printing based on the print data generated.

15 Claims, 14 Drawing Sheets

FIG.7

| MANAGEMENT ACCOUNT 701 | SERVICE ACCOUNT 702 |
|---|---|
| ACCOUNT A1 | ACCOUNT A2 |
| ACCOUNT B1 | ACCOUNT B2 |
| DEFAULT ACCOUNT | ACCOUNT C |

FIG.8

| | 802 | 803 | 804 | 805 | 806 | 807 | 808 | 809 |
|---|---|---|---|---|---|---|---|---|
| ACCOUNT NAME | ACCOUNT A2 ||| ACCOUNT B2 || ACCOUNT C |||
| SETTING NAME | PHOTOGRAPHY PRINT SETTING | DOCUMENT PRINT SETTING | PRINT SETTING W | PHOTOGRAPHY PRINT SETTING | PRINT SETTING P | PHOTOGRAPHY PRINT SETTING | DOCUMENT PRINT SETTING | MATT PAPER |
| CALL NAME | PHOTOGRAPHY PRINT SETTING | DOCUMENT PRINT SETTING | PRINT SETTING W | PHOTOGRAPHY PRINT SETTING | PHOTO KG | PHOTOGRAPHY PRINT SETTING | DOCUMENT PRINT SETTING | MATT PAPER |
| NUMBER OF COPIES | 1 | INQUIRE EACH TIME | 1 | 1 | 1 | 1 | 1 | 1 |
| SHEET SIZE | 3.5 × 5 | CASSETTE SHEET | POSTCARD | 3.5 × 5 | 4 × 6 | 3.5 × 5 | TRAY SHEET | A4 |
| SHEET TYPE | GLOSSY PAPER | PLAIN PAPER | POSTCARD | GLOSSY PAPER | GLOSSY PAPER | GLOSSY PAPER | PLAIN PAPER | MATT PAPER |
| QUALITY | STANDARD | STANDARD | FINE | FINE | STANDARD | STANDARD | STANDARD | FINE |
| TWO-SIDED PRINTING | ONE-SIDED PRINTING | LONG EDGE BINDING | ONE-SIDED PRINTING | ONE-SIDED PRINTING | ONE-SIDED PRINTING | ONE-SIDED PRINTING | ONE-SIDED PRINTING | ONE-SIDED PRINTING |
| LAYOUT | BORDERED | BORDERLESS | BORDERLESS | BORDERED | BORDERED | BORDERED | BORDERLESS | BORDERED |
| COLOR | COLOR | MONOCHROME | MONOCHROME | COLOR | COLOR | COLOR | COLOR | COLOR |
| ... | ... | ... | ... | ... | ... | ... | ... | ... |

FIG. 11

| ACCOUNT NAME | ACCOUNT A2 | | | ACCOUNT B2 | | | ACCOUNT C | | |
|---|---|---|---|---|---|---|---|---|---|
| SETTING NAME | PHOTOGRAPHY PRINT SETTING | DOCUMENT PRINT SETTING | PRINT SETTING W | PHOTOGRAPHY PRINT SETTING | DOCUMENT PRINT SETTING | PHOTOGRAPHY PRINT SETTING | DOCUMENT PRINT SETTING | MATT PAPER |
| CALL NAME | PHOTOGRAPHY PRINT SETTING | DOCUMENT PRINT SETTING | PRINT SETTING W | PHOTOGRAPHY PRINT SETTING | DOCUMENT PRINT SETTING | PHOTOGRAPHY PRINT SETTING | DOCUMENT PRINT SETTING | MATT PAPER |
| NUMBER OF COPIES | — | 1 | — | — | — | — | — | — |
| SHEET SIZE | 3.5 × 5 | — | A4 | — | — | — | — | — |
| SHEET TYPE | GLOSSY PAPER | — | — | — | — | — | — | — |
| QUALITY | STANDARD | STANDARD | FINE | FINE | STANDARD | STANDARD | STANDARD | FINE |
| TWO-SIDED PRINTING | ONE-SIDED PRINTING | LONG EDGE BINDING | ONE-SIDED PRINTING | — | — | ONE-SIDED PRINTING | ONE-SIDED PRINTING | ONE-SIDED PRINTING |
| LAYOUT | BORDERED | BORDERLESS | BORDERLESS | BORDERED | BORDERLESS | BORDERED | BORDERLESS | BORDERED |
| COLOR | COLOR | MONOCHROME | MONOCHROME | COLOR | MONOCHROME | COLOR | COLOR | COLOR |
| ⋮ | ⋮ | ⋮ | ⋮ | ⋮ | ⋮ | ⋮ | ⋮ | ⋮ |

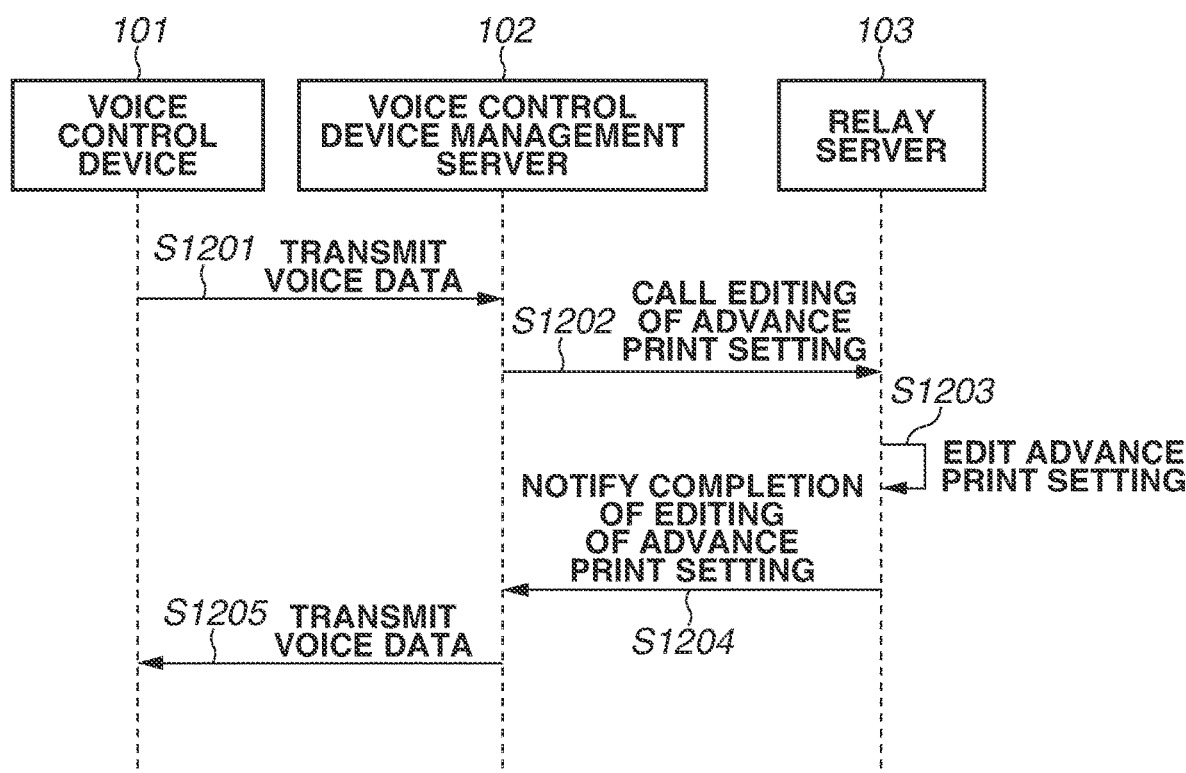

CONTROL SYSTEM, SERVER SYSTEM, AND CONTROL METHOD

BACKGROUND

Field

The present disclosure relates to a control system, a server system, and a control method. In particular, the present disclosure relates to a control system, a server system, and a control method that can perform printing based on a voice instruction.

Description of the Related Art

Japanese Patent Application Laid-Open No. 2006-301964 discusses advance registration of user identifiers (IDs) and favorite print settings corresponding to the user IDs in a storage unit via an operation unit of a multifunction printer (MFP) or a personal computer. According to Japanese Patent Application Laid-Open No. 2006-301964, a favorite setting registered in a storage unit is called based on a user ID, and printing is performed based on the favorite setting.

SUMMARY

According to an aspect of the present disclosure, a control system includes at least one server, and a printing apparatus, wherein the at least one server includes an identification unit configured to, in a case where a voice control device is given a print instruction by voice, identify image data to be printed based on voice data output from the voice control device, and a call unit configured to, based on user information identified based on the voice data output from the voice control device, call a print setting associated with the identified user information, wherein print data is generated based on the image data identified by the identification unit and the print setting called by the call unit, and wherein the printing apparatus is configured to perform printing based on the print data generated.

Further features of the present disclosure will become apparent from the following description of exemplary embodiments with reference to the attached drawings.

BRIEF DESCRIPTION OF THE DRAWINGS

FIG. 7 is a table illustrating a database related to a management account and a service account.

FIG. 8 is a table illustrating a database of advance print settings.

FIG. 11 is a table illustrating a database of advance print setting templates.

FIG. 12 is a sequence diagram illustrating processing for editing the advance print setting.

DESCRIPTION OF THE EMBODIMENTS

Figure 1:
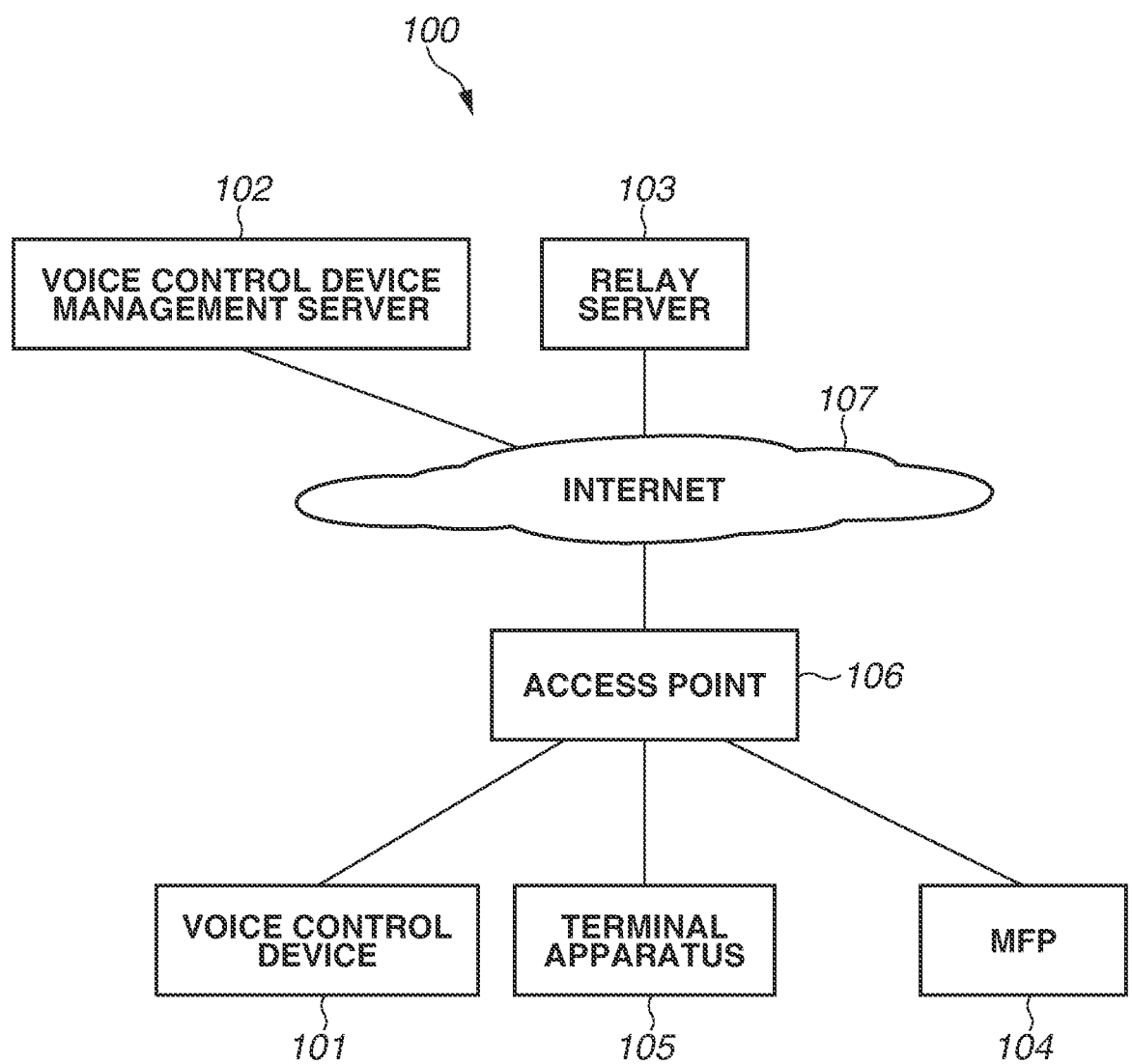
FIG. 1 is a diagram illustrating a configuration of a control system.

In the method discussed in Japanese Patent Application Laid-Open No. 2006-301964, an user operates the operation unit of the multifunction printer (MFP) or the personal computer to give a print instruction. There have recently been various use cases where printing apparatuses are used. The present disclosure features further improving operability of giving the print instruction.

Exemplary embodiments of the present disclosure will be described in detail below with reference to the accompanying drawings. The following exemplary embodiments are not intended to limit the present disclosure, and not all combinations of features described in the exemplary embodiments are necessarily indispensable to the solving means of the present disclosure. Like components will be designated by the same reference numerals, and redundant description thereof will be omitted.

[System Configuration]

FIG. 1 is a diagram illustrating an example of a configuration of a control system 100 according to an exemplary embodiment. The control system 100 illustrated in FIG. 1 includes a voice control device 101, a voice control device management server (hereinafter, also referred to simply as a management server) 102, a relay server 103, and an MFP 104. The control system 100 may further include a terminal apparatus 105 and an access point 106. The MFP 104 is an example of a printing apparatus having a print function. The terminal apparatus 105 may be any terminal apparatus, such as a smartphone, personal computer (PC), a tablet terminal, a mobile phone, and a personal digital assistant (PDA). In the description below, the terminal apparatus 105 is a smartphone. An example of the access point 106 is a wireless local area network (LAN) router. The MFP 104 and the terminal apparatus 105 connected to the access point 106 can access an Internet 107 via the access point 106. In the present exemplary embodiment, the voice control device 101, the MFP 104, and the terminal apparatus 105 wirelessly connect to the access point 106 based on a wireless communication method of the wireless LAN compliant with the Institute of Electrical and Electronics Engineers (IEEE) 802.11 standard series. In other words, the voice control device 101, the MFP 104, and the terminal apparatus 105 are connected to a local network constructed by the access point 106.

In the control system 100 according to the present exemplary embodiment, the user can issue a print instruction by voice. For example, the voice control device 101 is a device called a smart speaker or an artificial intelligence (AI) speaker. More specifically, the voice control device 101 can perform speech recognition on the user's voice input to a microphone, and transmit the resulting voice data via the network constructed by the access point 106 and the Internet 107. The voice control device 101 can also output a voice based on the voice data received via the Internet 107 and the network constructed by the access point 106 from a speaker. The voice control device 101 and the terminal apparatus 105 can communicate with the management server 102 via the access point 106 and the Internet 107.

The control system 100 according to the present exemplary embodiment includes a server system including a plurality of servers. The management server 102 manages the voice control device 101. For example, the management server 102 performs processing for authenticating the user and identifying a management account based on the voice data output from the voice control device 101. The management server 102 also identifies a service account of a print service, stored in association with the management account. The management server 102 further performs predetermined processing to be described below, for example, based on the voice data received from the voice control device 101.

The management server 102 and the relay server 103 are connected to each other via the Internet 107. The relay server 103 controls the MFP 104. For example, the relay server 103 generates print data in response to a request from the management server 102, and transmits the print data to the MFP 104. The MFP 104 outputs information about the MFP 104 (for example, information about functions of the MFP 104 and information about a state of the MFP 104) to the relay server 103 via the Internet 107.

In the system diagram illustrated in FIG. 1, the voice control device 101, the MFP 104, and the terminal apparatus 105 connect to the same access point 106 to gain access to the Internet 107. However, such a configuration is not restrictive. For example, the voice control device 101, the MFP 104, and the terminal apparatus 105 each may connect to a different access point to gain access to the Internet 107. Mobile communication networks such as Long-Term Evolution (LTE) and the fourth generation (4G) network may be used to gain access to the Internet 107 without using the access point 106.

[Configuration of Voice Control Device]

Figure 2:
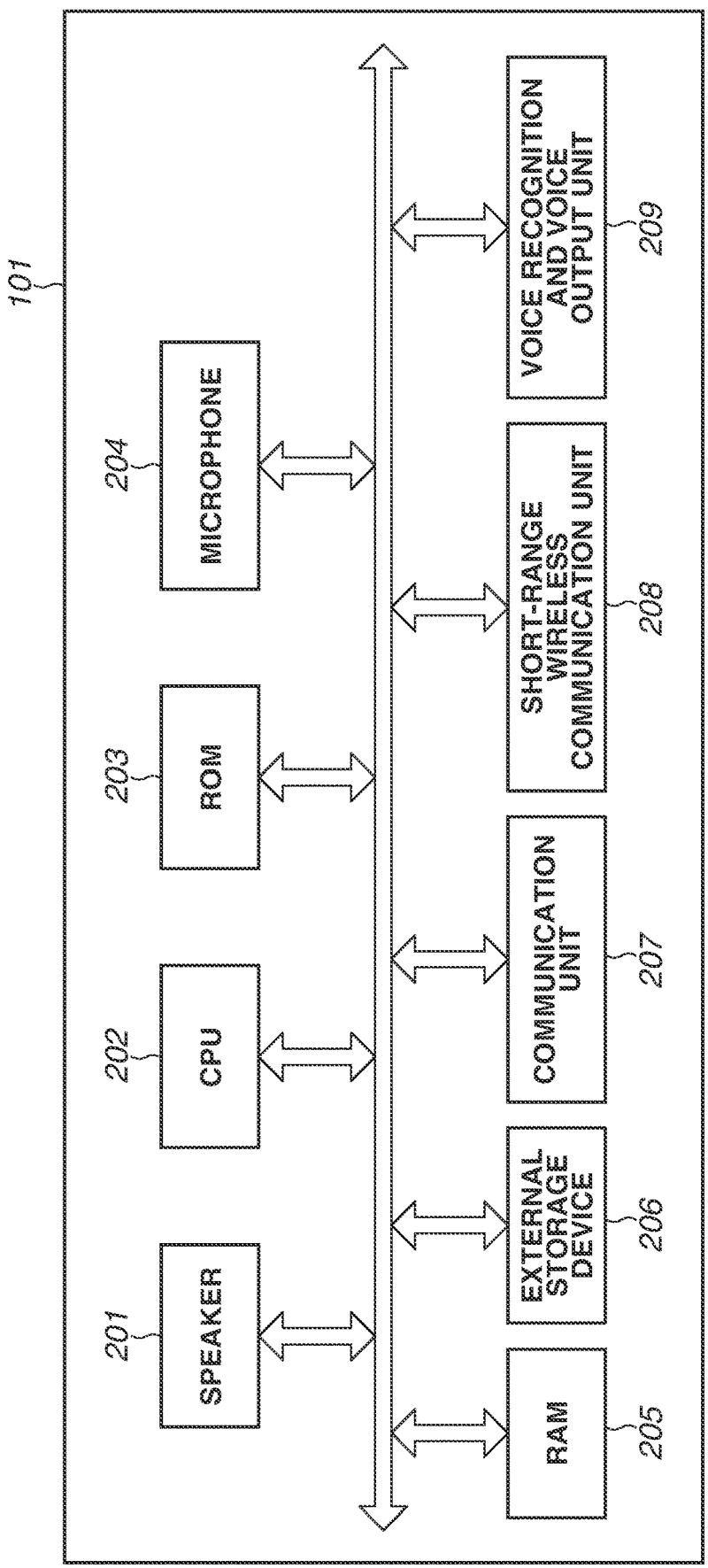
FIG. 2 is a block diagram illustrating a configuration of a voice control device.

FIG. 2 is a block diagram illustrating a hardware configuration of the voice control device 101. The voice control device 101 includes a speaker 201, a central processing unit (CPU) 202, a read-only memory (ROM) 203, a microphone 204, a random access memory (RAM) 205, an external storage device 206, a communication unit 207, a short-range wireless communication unit 208, and a voice recognition and voice output unit 209. The voice control device 101 may further include a display unit (not illustrated). The display unit includes a light-emitting diode (LED) and a liquid crystal display (LCD), and displays a screen based on various types of data. The display unit may include a touch display to accept various inputs from the user. In other words, the display unit may be an interface for accepting data input and instructions from the user. The display unit may be an operation panel including a physical keyboard, buttons, and/or a touch panel.

The blocks illustrated in FIG. 2 are connected to each other by using an internal bus, for example. In the present exemplary embodiment, an operation of the voice control device 101 is implemented, for example, by the CPU 202 loading a program stored in the ROM 203 into the RAM 205 and executing the program.

The speaker 201 makes a voice output based on voice data output from the management server 102. For example, the CPU 202 is disposed on a system control board, and controls the voice control device 101 in a centralized manner. The ROM 203 stores fixed data such as a control program for the CPU 202 to execute, a data table, and a built-in operating system (OS) program. In the present exemplary embodiment, the control program stored in the ROM 203 is subjected to software execution control of the built-in OS stored in the ROM 203. Examples of the software execution control include scheduling, task switching, and interrupt handling. The microphone 204 receives sounds around the voice control device 101, such as a voice uttered by the user.

The RAM 205 includes, for example, a static RAM (SRAM) that uses a backup power supply. The RAM 205 can store data such as program control variables without volatilization since the data is retained by using a not-illustrated primary battery for data backup. The RAM 205 includes a memory area for storing setting information and management data about the voice control device 101. The RAM 205 is also used as a main memory and a work memory of the CPU 202. The external storage device 206 stores application software.

The communication unit 207 includes a circuit and an antenna for performing communication based on a predetermined wireless communication method. For example, the communication unit 207 can wirelessly connect to the external access point 106. The communication unit 207 can also operate temporarily as an access point by itself. In other words, the communication unit 207 may have an access point function. The wireless communication used in the present exemplary embodiment may include a capability of operating based on the wireless communication method of a wireless LAN compliant with the IEEE 802.11 standard series, or a capability of operating based on other wireless communication methods. The short-range wireless communication unit 208 performs short-range wireless communication with another apparatus located within a certain short range from the voice control device 101. The short-range wireless communication unit 208 performs communication by a wireless communication method different from that of the communication unit 207. In the present exemplary embodiment, the short-range wireless communication unit 208 operates based on the Bluetooth® standard.

The voice recognition and voice output unit 209 recognizes the voice input via the microphone 204 to generate voice data. The voice recognition and voice output unit 209 also converts voice data received from outside or message data stored in advance into a voice signal and outputs the voice from the speaker 201.

[Configuration of Servers]

Figure 3:
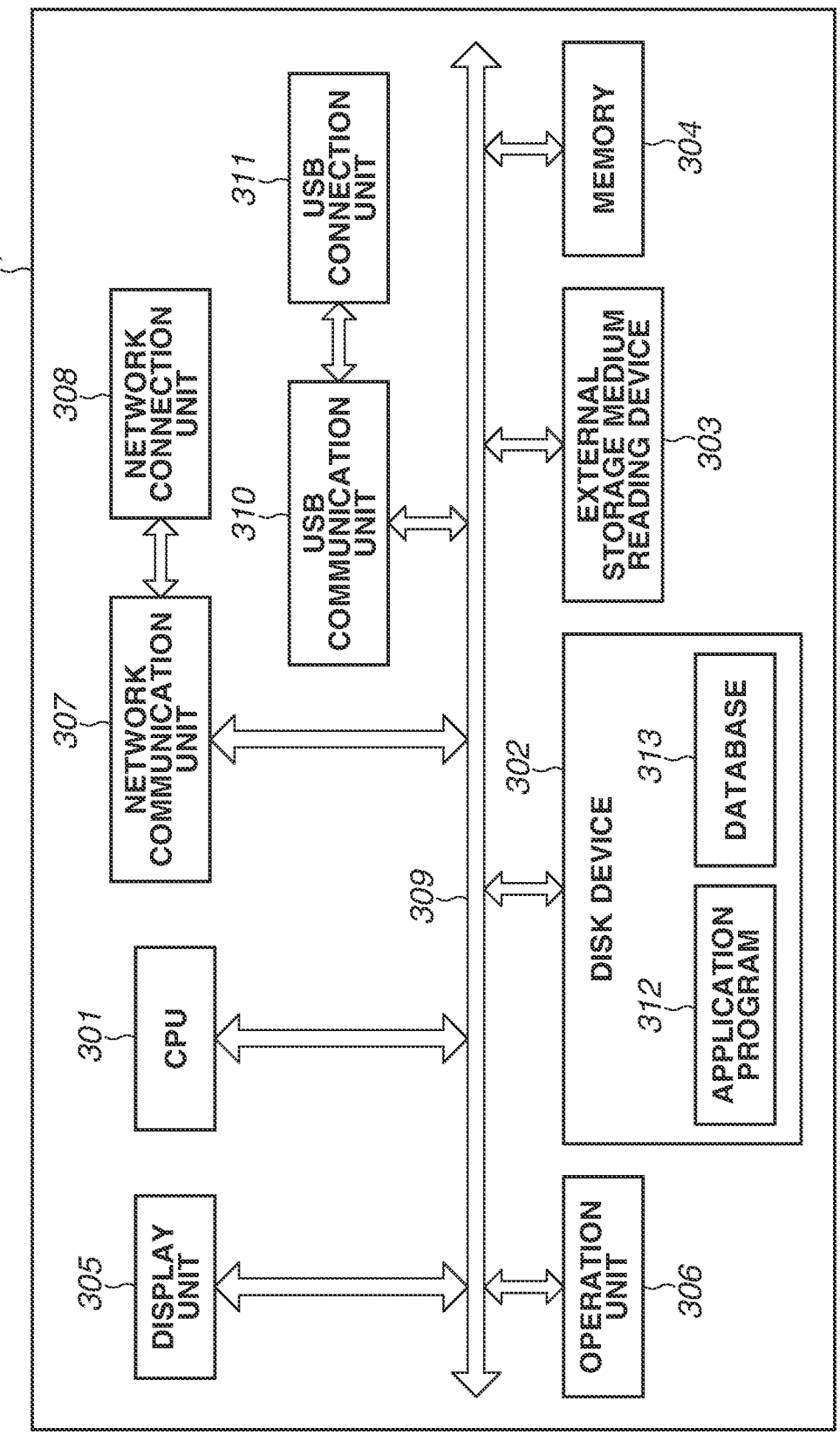
FIG. 3 is a block diagram illustrating a configuration of a management server and a relay server.

FIG. 3 is a block diagram illustrating a configuration of the management server 102 and the relay server 103. FIG. 3 illustrates a configuration common to the above-described two servers. The description below deals with the management server 102.

A CPU 301 is intended to control the management server 102 in a centralized manner. A disk device 302 stores an application program 312, a database 313, an OS, and various files and data. An external storage medium reading device 303 is a device for reading information, such as a file, stored in an external storage medium such as a Secure Digital (SD) card. A memory 304 includes a RAM. The CPU 301 temporarily stores and buffers data in the memory 304 as appropriate.

A display unit 305 includes an LCD, for example, and displays various types of information. An operation unit 306 includes a keyboard and a mouse for the user to make various input operations, and can accept instructions and operations from the user. A network communication unit 307 is connected to a network such as the Internet 107 via a network connection unit 308, and performs various communications. The network connection unit 308 supports a network medium such as a wired LAN and a wireless LAN. If the wired LAN is supported, an example of the network connection unit 308 is a connector for connecting a wired LAN cable. If the wireless LAN is supported, an example of the network connection unit 308 is an antenna. The network connection unit 308 may support both the wired LAN and the wireless LAN. A Universal Serial Bus (USB) communication unit 310 is connected to various peripheral devices via a USB connection unit 311, and performs various communications.

The blocks illustrated in FIG. 3 are connected to each other via a bus 309. An operation of the management server 102 (or relay server 103) according to the present exemplary embodiment is implemented, for example, by the CPU 301 loading a program from the disk device 302 into the memory 304 and executing the program. The speech recognition function of the voice recognition and voice output unit 209 illustrated in FIG. 2 may be included in the configuration of FIG. 3. In such a case, for example, the apparatus having the configuration of FIG. 3 can perform speech recognition on the voice signal transmitted from the voice control device 101 to recognize and extract a predetermined word. While the management server 102 and the relay server 103 are described as separate apparatuses in the present exemplary embodiment, the management server 102 and the relay server 103 may be configured as an integrated server (information processing apparatus) having the server functions of both of the servers. In the present exemplary embodiment, the management server 102 includes a single server (information processing apparatus), whereas a plurality of servers may cooperate to implement the function of the management server 102. The relay server 103 also includes a single server (information processing apparatus), whereas a plurality of servers may cooperate to implement the function of the relay server 103.

[Configuration of MFP]

Figure 4:
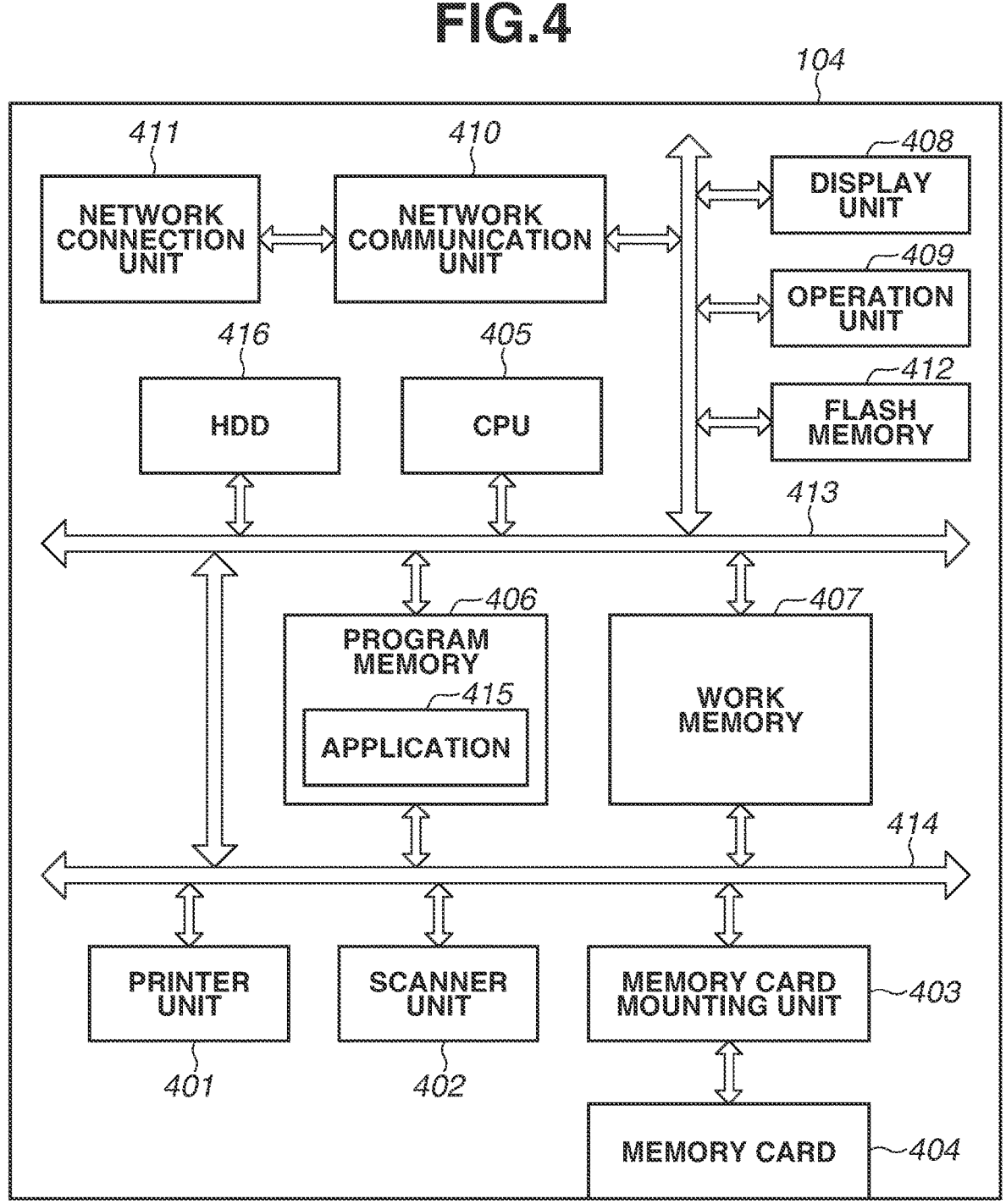
FIG. 4 is a block diagram illustrating a configuration of a multifunction printer (MFP).

FIG. 4 is a block diagram illustrating a configuration of the MFP 104. While the present exemplary embodiment deals with the MFP 104, an apparatus having a configuration other than an MFP may be used instead as long as the apparatus has a print function. Examples include an image processing apparatus, a copying machine, a facsimile, and a single-function printing apparatus. The print function of the MFP 104 is implemented by a printer unit 401, a scanner function by a scanner unit 402, and a storage function by a memory card mounting unit 403 and a memory card 404. Such components are connected to each other via a bus 414.

The printer unit 401 records image data received from outside or image data stored in the memory card 404 on a recording medium such as a print sheet by a recording method such as an inkjet recording method and an electrophotographic method. The printer unit 401 also manages information about consumable members. Examples include ink information about a remaining amount of ink and sheet information about the number of loaded sheets.

The scanner unit 402 optically reads a document set on a document platen (not illustrated), converts the read document into electronic data, and further converts the electronic data into image data in a specified file format. The scanner unit 402 transmits the image data to an external apparatus via a network or stores the image data in a storage area of a hard disk drive (HDD) 416. To implement a copy service, the scanner unit 402 transfers the image data generated by reading the document placed on the document platen to the printer unit 401, and the printer unit 401 performs printing on a recording medium such as a print sheet based on the image data.

The memory card 404 mounted on the memory card mounting unit 403 stores various types of file data. The file data can be read and edited by an external apparatus via a network. File data from an external apparatus can be stored into the memory card 404.

The MFP 104 further includes a CPU 405, a program memory 406, a work memory 407, a display unit 408, an operation unit 409, a network communication unit 410, a network connection unit 411, and a flash memory 412. The CPU 405 is intended to control the components of the MFP 104 in a centralized manner. The program memory 406 includes a ROM, and stores various types of program code and an application 415 for communicating with an external server. The application 415 can also access the printer unit 401 and obtain consumable information about ink and sheets. The work memory 407 includes a RAM, and temporarily stores and buffers image data during execution of the services. The display unit 408 includes an LCD, for example, and displays various types of information such as a user interface screen. The operation unit 409 includes a keyboard, a mouse, and a switch, and can accept instructions and operations from the user. The network communication unit 410 connects the MFP 104 to a network via the network connection unit 411 and performs various communications.

The network connection unit 411 supports a network medium such as a wired LAN and a wireless LAN. If the wired LAN is supported, an example of the network connection unit 411 is a connector for connecting a wired LAN cable. If the wireless LAN is supported, an example of the network connection unit 411 is an antenna. The network connection unit 411 may support both the wired LAN and the wireless LAN. The flash memory 412 is a nonvolatile memory for storing image data received by the network communication unit 410. Such components are connected to each other via a bus 413. A block that performs data conversion may be interposed between the buses 414 and 413. In the present exemplary embodiment, an operation of the MFP 104 is implemented, for example, by the CPU 405 reading a program from the program memory 406 into the work memory 407 and executing the program.

The configurations illustrated in FIGS. 2, 3, and 4 are merely examples, and each of the apparatuses may include hardware other than ones illustrated in the diagrams. In each of FIGS. 2, 3, and 4, a plurality of blocks may be integrated into one block. A block may be divided into two or more blocks. In other words, each of the apparatuses illustrated in FIGS. 2, 3, and 4 may have another configuration as long as the processing of the present exemplary embodiment to be described below can be executed.

[Configuration of Terminal Apparatus]

Figure 14:
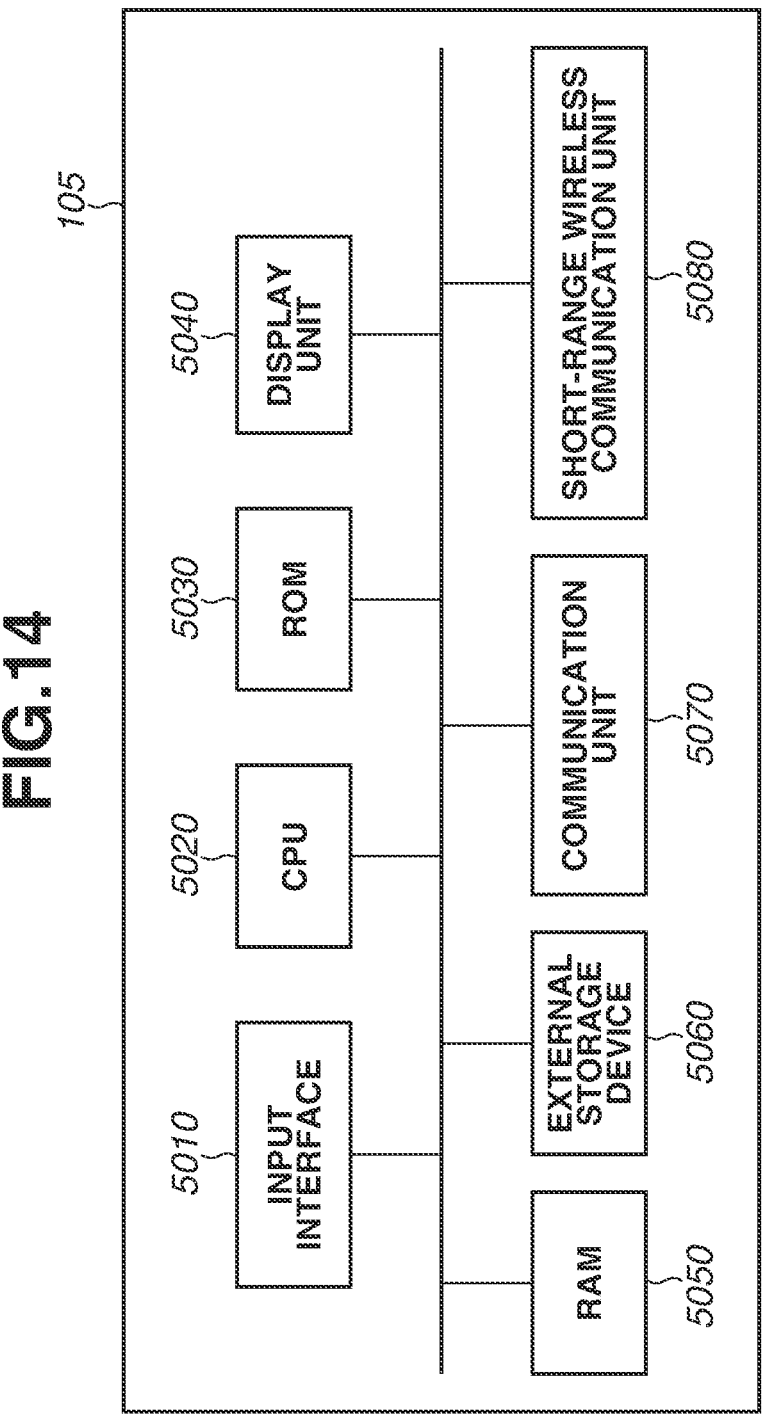
FIG. 14 is a block diagram illustrating a configuration of a terminal apparatus.

FIG. 14 is a block diagram schematically illustrating a hardware configuration of the terminal apparatus 105. For example, the terminal apparatus 105 includes an input interface 5010, a CPU 5020, a ROM 5030, a display unit 5040, a RAM 5050, an external storage device 5060, a communication unit 5070, and a short-range wireless communication unit 5080. The terminal apparatus 105 may further include a microphone (not illustrated) and a speaker (not illustrated). Such blocks are connected to each other using an internal bus, for example.

The CPU 5020 is a system control unit and controls the entire terminal apparatus 105. The RAM 5050 includes, for example, a dynamic RAM (DRAM) that uses a backup power supply, similar to the RAM 205. The RAM 5050 is also used as a main memory and a work memory of the CPU 5020. The ROM 5030 stores fixed data such as a control program for the CPU 5020 to execute, a data table, and an OS program. In the present exemplary embodiment, an application program intended for the voice control device 101 (hereinafter, a voice control application) is installed and stored in the ROM 5030 of the terminal apparatus 105.

The display unit 5040 includes an LED and an LCD, and displays a screen based on various types of data. The display unit 5040 may include a touch display and have the function of accepting various inputs from the user. In other words, the display unit 5040 may be an interface for accepting data input and operation instructions from the user. The display unit 5040 may be an operation panel including a physical keyboard, a button, and/or a touch panel. The communication unit 5070 has a function similar to that of the above-described communication unit 207, and can wirelessly connect to another apparatus via the access point 106. The short-range wireless communication unit 5080 is a device that can perform short-range wireless communication with the short-range wireless communication unit 208 by using the same wireless communication method as that of the short-range wireless communication unit 208.

[Account Association Processing Sequence]

Next, account association processing (hereinafter, referred to as association processing) will be described. The association processing refers to user registration processing for the user to use the services of the control system 100 (operation of the present exemplary embodiment) by the voice instruction. The association processing associates the user's voice accepted by the voice control device 101 with the MFP 104 to perform printing.

Figure 5:
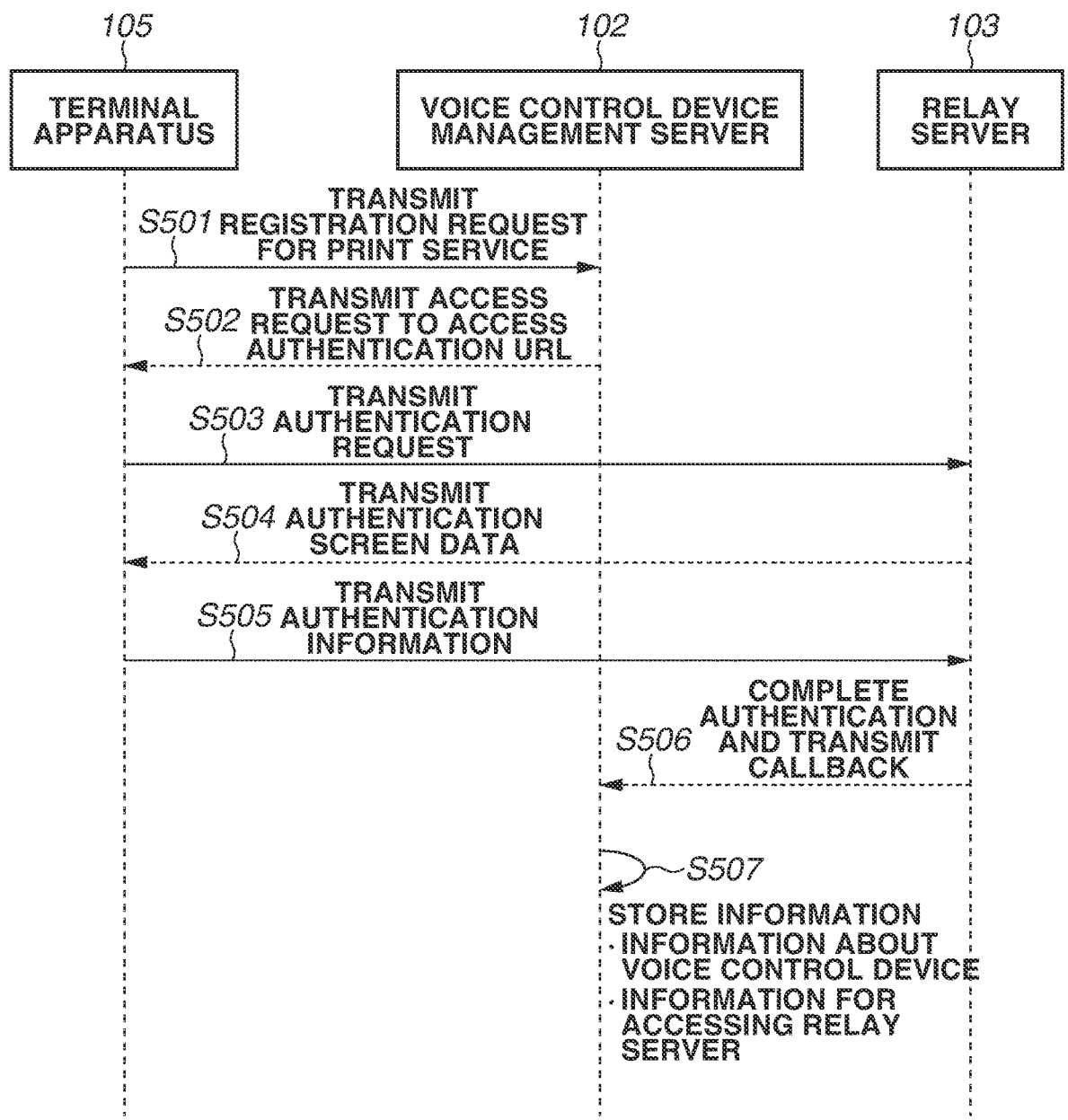
FIG. 5 is a sequence diagram illustrating processing for associating the voice control device with the MFP.

FIG. 5 is a sequence diagram illustrating the association processing. In this sequence, the processing performed by the apparatuses is implemented by the CPU of each of the apparatuses executing a program stored in the ROM of each of the apparatuses. The program for the CPU 5020 of the terminal apparatus 105 to execute is the voice control application.

Before starting the sequence of FIG. 5, the user logs in to a management account issued and managed by the management server 102 (user account intended for the voice control device 101) in advance by using the voice control application of the terminal apparatus 105. Thus, the management server 102 manages the terminal apparatus 105 and the management account in association with each other. Thus, the management server 102 can recognize information about the voice control application of the terminal apparatus 105 associated with the management account. The terminal apparatus 105 recognizes information about the management account (user identifier (ID) and password).

Before the sequence of FIG. 5 is started, the voice control device 101 and the management account are also associated with each other. More specifically, the voice control device 101 obtains the information about the management account from the terminal apparatus 105 via the LAN, and transmits identification information about the voice control device 101 and the information about the management account to the management server 102. Thus, the management server 102 manages the voice control device 101 and the management account in association with each other. If the voice control device 101 includes a display unit, the user may log in to the management account and associate the voice control device 101 with the management account by using the display unit.

Before the sequence of FIG. 5 is started, the user's voice data and the management account are further associated with each other. More specifically, the voice control device 101 transmits the voice data based on the voice accepted from the user to the management server 102. Then, the management server 102 manages the user's voice data and the management account in association with each other. In the present exemplary embodiment, a plurality of management accounts can be registered in association with one voice control device 101. More specifically, if user A gives the voice instruction to the voice control device 101, the management server 102 identifies the management account of user A based on the voice data of user A. If user B gives the voice instruction to the same one voice control device 101, the management server 102 can identify the management account of user B based on the voice data of user B. If the terminal apparatus 105 includes a microphone and a speaker, voice data based on voice accepted by the terminal apparatus 105 may be transmitted from the terminal apparatus 105 to the management server 102. More specifically, the user can issue an instruction by using the voice control application in the terminal apparatus 105 so that the voice is accepted and associated with the management account. In such a case, the management server 102 can manage the accepted voice data and the management account in association with each other.

Before starting the sequence of FIG. 5, the user obtains the service account managed by the relay server 103 in advance. The service account managed by the relay server 103 is a user account for using the print service provided by the relay server 103.

In the sequence of FIG. 5, the user initially issues an instruction for requesting registration to the print service via the voice control device 101 by using the terminal apparatus 105 associated with the voice control device 101 in the management account. In step S501, the terminal apparatus 105 transmits a registration request for the print service to the management server 102 based on the user instruction. Since the registration request is made with the terminal apparatus 105 logging in to the management account managed by the management server 102, the management server 102 can identify which management account the registration request is made from. For example, the registration request may be made from a local application (voice control application) installed on the terminal apparatus 105, or from a web page via a web browser.

In step S502, the management server 102 receiving the registration request for the print service transmits an access request to access an authentication Universal Resource Locator (URL) of the relay server 103 to the terminal apparatus 105.

In step S503, the terminal apparatus 105 receiving the access request accesses the authentication URL and transmits an authentication request to the relay server 103.

In step S504, the relay server 103 receiving the authentication request transmits authentication screen data to the terminal apparatus 105.

The terminal apparatus 105 obtaining the authentication screen data displays an authentication screen based on the authentication screen data. By using the displayed authentication screen, the user inputs the information registered in advance (authentication information) about the service account for using the print service provided by the relay server 103. Examples of the authentication information include the user ID and password for the registered service account. By inputting the authentication information, the user can log in to the print service of the relay server 103.

If the user inputs the authentication information about the service account for using the print service of the relay server 103 on the terminal apparatus 105, then in step S505, the terminal apparatus 105 transmits the input authentication information about the service account to the relay server 103.

The relay server 103 performs authentication processing for using the print service based on the authentication information transmitted from the terminal apparatus 105.

More specifically, the relay server 103 determines whether the obtained authentication information about the service account is included (authentication information is registered) in a service account list managed by the relay server 103. If the obtained authentication information about the service account is determined to be included in the service account list, the authentication processing is normally completed (i.e., logging in to the service account has been completed). If the obtained authentication information about the service account is not included in the service account list (e.g., there is no match with the user ID and the password), the relay server 103 transmits an error notification to the terminal apparatus 105.

If the authentication processing is normally completed, then in step S506, the relay server 103 transmits a callback to the management server 102.

The management server 102 obtains an access token for accessing the relay server 103 from the callback transmitted from the relay server 103. The management server 102 can access the relay server 103 by using the obtained access token. The access token is issued for each service account of the relay server 103. Thus, the relay server 103 can identify the user of which service account the login user is based on the access token, and can identify the MFP 104 registered in association with the service account.

In step S507, the management server 102 stores the information used for accessing the relay server 103, such as the access token and a refresh token, along with the information about the voice control device 101 associated with the terminal apparatus 105. In the present exemplary embodiment, the access and refresh tokens have an infinite expiration date (or an expiration data that can be regarded as being infinite in practical use). Based on the obtained access token, the management server 102 can identify the corresponding service account. The management server 102 can also identify the management account where the registration request for the print service is made based on the registration request in step S501. Thus, in step S507, the management server 102 can store the service account and the management account into the memory 304 of the management server 102 in association with each other.

By such association processing between the accounts, the MFP 104 to perform printing is identified when the user gives a print instruction to the voice control device 101 by voice. In other words, the voice control device 101 is associated with the MFP 104. In addition, in the present exemplary embodiment, the service account can also be called based on the voice data since the voice data and the management account are associated with each other.

FIG. 7 illustrates a management database. In FIG. 7, a management account 701 and a service account 702 are stored in association with each other. More specifically, a management account A1 is associated with a service account A2, and a management account B1 is associated with a service account B2. A default management account is associated with a service account C.

In the above-described example, the user's authentication operation is described as an example of the method for associating the voice control device 101 with the MFP 104. However, another method may be used as long as the voice control device 101 can be associated with the MFP 104. In the above-described example, the user registration processing is performed by using two accounts, i.e., the management account of the management server 102 and the service account of the relay server 103. However, the present exemplary embodiment is not limited thereto. More specifically, the number of accounts for executing the print service by using the voice control device 101 may be one. In other words, the voice control device 101 may be associated with the MFP 104 based on one account.

[Sequence for Processing Print Instruction]

Figure 6:
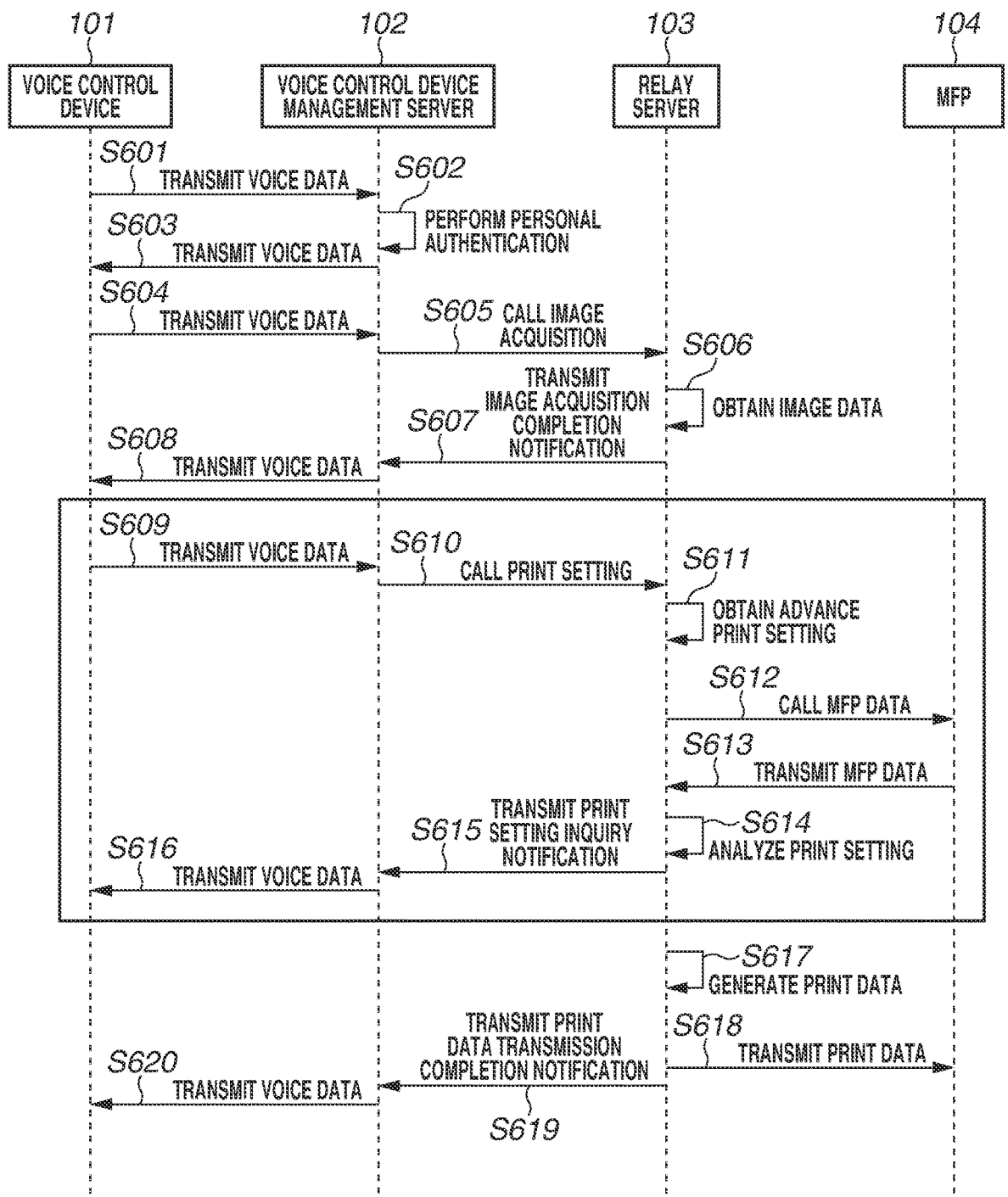
FIG. 6 is a sequence diagram illustrating processing of the control system using an advance print setting.

A sequence where the user gives a print instruction by voice and the MFP 104 associated with the voice control device 101 performs printing will be described below with reference to FIG. 6. Suppose that the account association processing of FIG. 5 has been performed before the sequence of FIG. 6 is started. In the present sequence, the processing performed by each of the apparatuses is implemented by the CPU of each of the apparatuses executing the program stored in the ROM of each of the apparatuses.

In FIG. 6, first, the user says a wake word that is a predetermined keyword, and then, says what the user wants to do. For example, the user speaks "Activate the printer" after the wake word. Receiving a voice of the wake word, the voice control device 101 receives a subsequently spoken voice. More specifically, in step S601, the voice control device 101 receives the voice "Activate the printer", and transmits voice data to the management server 102 based on the voice. Suppose, for example, that the user speaks "Activate the printer. Print the picture X in A4 with the photography print setting". In such a case, the voice control device 101 may transmit voice data including the voice data of step S601, voice data of step S604, and voice data of step S609. In other words, the voice control device 101 may transmit the voice data including information about contents to be printed and information about a print setting.

In step S602, the management server 102 receives the voice data transmitted in step S601 and performs personal authentication. In the personal authentication, first, the management server 102 identifies the management account based on the voice data output from the voice control device 101. Then, the management server 102 refers to the management database illustrated in FIG. 7 to determine whether a service account that is associated with the identified management account is registered. If there is the service account associated with the management account, the management server 102 calls the associated service account as one corresponding to the obtained voice data. More specifically, if the management server 102 obtains the voice data of user A, the management server 102 identifies the management account A1 corresponding to the voice data of user A, and further identifies the service account A2 associated with the management account A1. Thus, the management server 102 can call the service account A2 based on the voice data of user A.

If there is no management account corresponding to the obtained voice data (i.e., the management account corresponding to the voice data is not identified), the management server 102 may recognize the management account to be a default account. In FIG. 7, the default management account is associated with the service account C. Thus, for unregistered voice data, the management server 102 calls the service account C.

By the above-described processing, the personal authentication based on the voice data is performed. While voice data is also obtained at subsequent utterance timings (steps S604 and S609), the personal authentication based on such voice data is not performed in the present exemplary embodiment. In other words, the service account authenticated in step S602 is applied, and instructions are recognized as those from the service account. However, the personal authentication may be performed for each utterance.

In step S603, the management server 102 generates voice data taking into account the result of the personal authentication in step S602, and transmits the voice data to the voice control device 101. For example, if the service account A2 that is the service account of user A is called by the personal authentication in step S602, the management server 102 may cause the voice control device 101 to reproduce a notification that the personal authentication is completed on the service account of the print service, such as "User A's account is linked". The notification using the account name ("user A") can be made as described above if the account name is registered as information related to the service account A2. The management server 102 may transmit voice data for reproducing a notification prompting the user's next voice instruction. The management server 102 may cause the voice control device 101 to reproduce both the notification of the completion of the personal authentication and the notification prompting the user's next voice instruction. For example, a notification indicating the result of the personal authentication and prompting a voice input, such as "User A's account is linked. What to print?" may be made to the user. If the management account is not identified in step S602, the management account is handled as being a default account. In such a case, voice data conveying that the personal authentication on the management account has failed, such as "The default account is linked", may be transmitted. If the management account is the default account, association with the service account C corresponding to the default account may be notified.

If the user specifies the contents to be printed via the voice control device 101, the contents to be printed are to be identified based on a voice. For example, if the user speaks "Print the picture X" to specify the image, the voice control device 101 receiving the user's voice transmits the voice data to the management server 102. More specifically, in step S604, the voice control device 101 receives the user's voice of "Print the picture X" that the user has spoken to specify the contents, and transmits the voice data to the management server 102. If the contents have been determined by voice or by means other than voice before step S604, the voice control device 101 transmits no voice data in step S604.

In step S605, the management server 102 issues an instruction for calling image acquisition to the relay server 103 based on the obtained voice data. In issuing the instruction for calling the image acquisition, the management server 102 transmits information about the service account 702 associated with the management account 701 to the relay server 103 along with the specification of the picture X. For example, if the personal authentication has been completed on the management account A1 in FIG. 7, the management server 102 transmits information about the service account A2 to the relay server 103.

If the relay server 103 receives the instruction for calling the image acquisition, then in step S606, the relay server 103 identifies the image data (contents) of the specified picture X based on the instruction, and obtains the image data of the picture X. In the present exemplary embodiment, the image data of the picture X is stored in the relay server 103 in advance. Thus, the relay server 103 identifies a storage location of the image data of the picture X based on the instruction from the management server 102.

To obtain the image data, the relay server 103 can call hierarchical information in the relay server 103 as acquisition source information about the image data, and obtain the image data. If the image data on the picture X is stored in a storage location other than the relay server 103 (in another server), the relay server 103 may identify and call the URL of the storage location of the image data. To call the image acquisition, the relay server 103 may use the information about the obtained service account 702. For example, if the instruction for calling the image acquisition includes the information about the service account A2 that is the service account 702, the relay server 103 obtains the image data of the picture X from a storage location accessible with authority of the service account A2. The image data obtained in step S606 is stored in the database 313 or the external storage medium reading device 303 of the relay server 103.

If there is an advance print setting (favorite setting) stored in advance, the relay server 103 may call the advance print setting in the step of acquiring the image data based on the service account A2 and the type of obtained image data. More specifically, based on the instruction "Print the picture X" from user A, the relay server 103 calls a print setting for photography printing registered for the service account A2 in advance as the advance print setting. The advance print setting will be described in detail below with reference to FIG. 8 in describing step S611.

In step S607, the relay server 103 transmits an image acquisition completion notification to the management server 102. The image acquisition completion notification includes message data in a text format for the voice control device 101 to output by voice.

In step S608, the management server 102 receiving the image acquisition completion notification generates voice data based on the message data included in the received image acquisition completion notification. Then, the management server 102 transmits the generated voice data to the voice control device 101. The voice control device 101 makes a voice output from the speaker 201 based on the received voice data. Thus, the voice control device 101 notifies the user of the completion of the image acquisition. The message data in the image acquisition completion notification may include contents for prompting the user's next utterance. For example, a message prompting the user to specify a print setting, such as "Which print setting to use for printing?" may be reproduced.

If the user speaks an instruction about a print setting in response to the voice output from the speaker 201 of the voice control device 101, then in step S609, the voice control device 101 receives the instruction about the print setting and outputs the voice data (voice data transmission processing). For example, if there is an advance print setting (favorite setting) registered by user A in advance, the user makes an utterance for calling the advance print setting, such as "Print it with the photography print setting". The user may speak keywords related to the print setting, such as "Print it on A4 glossy paper". The voice control device 101 outputs voice data based on the contents of the user's utterance. In other words, the voice control device 101 receives the voice related to a print setting, and transmits the voice data to the management server 102.

In step S610, the management server 102 receives the voice data of the print setting, and issues an instruction for calling the print setting to the relay server 103. The instruction for calling the print setting includes information about the print setting. For example, if the voice data of user A in step S609 includes an instruction "photography print setting", the management server 102 transmits information about "photography print setting" as an advance print setting. If the voice data of user A in step S609 includes instructions "A4" and "glossy paper", the management server 102 transmits information about "A4" and "glossy paper" as the print setting. In step S610, the management server 102 may add the information about the service account 702 to the instruction for calling the print setting. In other words, the management server 102 transmits an instruction for calling the print setting including the information about the print setting and the information about the service account 702, to the relay server 103.

Figure 9:
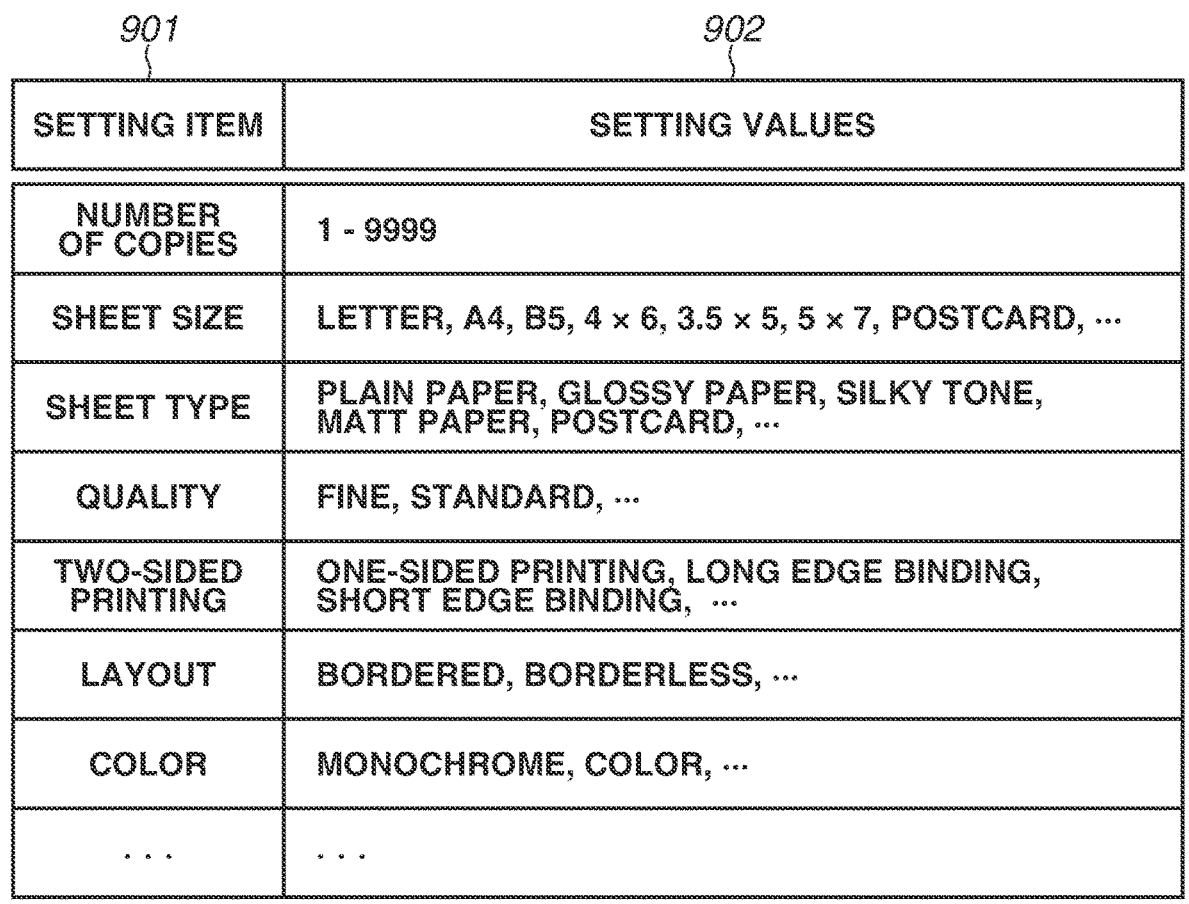
FIG. 9 is a table illustrating a database related to a setting item and setting values of the advance print setting.

In step S611, the relay server 103 receives the instruction for calling the print setting, and obtains the print setting. More specifically, the relay server 103 determines whether there is a corresponding advance print setting based on the received information about the service account 702 and the print setting. FIG. 8 illustrates a database including service accounts 702 and advance print settings. The database is stored in the database 313 or the external storage medium reading device 303 of the relay server 103. As illustrated in FIG. 8, the advance print settings are stored for each of the service accounts 702. Thus, the advance print settings with the same name may have different setting values from one service account to another. The numbers and types of stored advance print settings may be different from one service account to another. In FIG. 8, the service accounts A2 and B2 have respective photography print settings 802 and 805 having different setting values of the setting item "quality". As with the service account B2, it is also possible to store two or more photography-related advance print settings. The service account B2 has the photography print setting 805 and a photography print setting P 806. The setting item that can be registered as the advance print setting is managed as illustrated in FIG. 9. FIG. 9 illustrates a database including a setting item 901 of the print setting and possible setting values 902 corresponding to the setting item 901. The user can select a desired setting value from among the setting values 902 listed for the setting item 901, and register the setting value as an advance print setting. The user can change the setting value 902 MFP model by MFP model and/or can change the setting value 902 account by account. A detailed method for registering the advance print setting will be described below with reference to FIG. 10. The registered advance print setting is stored in the database 313 or the external storage medium reading device 303 of the relay server 103.

In step S611, for example, if an instruction including the information about the service account A2 and the "photography print setting" is received, the relay server 103 calls the setting corresponding to the "photography print setting" (in FIG. 8, the photography print setting 802) from among the print settings registered in the service account A2 (in FIG. 8, settings 802 to 804) based on the account name 801 of FIG. 8.

If there is no advance print setting corresponding to the received information about the print setting (i.e., no such print setting is registered in advance), the relay server 103 can use a default print setting. If an instruction including the information about the service account A2, "A4", and "glossy paper" is received, the relay server 103 recognizes that an individual setting is directly specified instead of the advance print setting, and calls the setting value "A4" for the sheet size and the setting value "glossy paper" for the sheet type as the print setting.

In calling the advance print setting, the relay server 103 can simultaneously call two or more advance print settings. For example, suppose that user A speaks "Print it with the photography print setting and the document print setting". In such a case, the relay server 103 calls the photography print setting 802 and a document print setting 803 from among the advance print settings. For example, user A may speak "Print it in A4 with the photography print setting". In such a case, the relay server 103 may call the photography print setting 802 as the advance print setting, and change the sheet size of the photography print setting 802 to A4.

If "photography print setting" and "photography print setting P" are specified along with the service account B2 associated with user B, the relay server 103 calls the photography print setting 805 and the photography print setting P 806 from among the advance print settings of the service account B2.

If a user associated with the service account C gives an instruction "Print the picture X on matt paper", the relay server 103 may obtain a photography print setting 807 and a matt paper 809 as the advance print settings.

If the obtained print setting includes a setting value using MFP information, then in step S612, the relay server 103 obtains MFP data. For example, the setting item "sheet size" of the document print setting 803 is "cassette sheet". In such a case, the relay server 103 obtains information about a sheet actually set (stored) in a cassette of the MFP 104, and uses the information as cassette sheet information. The setting item "sheet size" of a document print setting 808 is "tray sheet". In such a case, the relay server 103 obtains information about a sheet set (stored) on a tray of the MFP 104, and uses the information as tray sheet information. In other words, in step S612, the relay server 103 determines whether to use information about the MFP 104 as the setting value based on the instruction for calling the advance print setting. If the information about the MFP 104 is determined to be used, the relay server 103 calls the MFP data to obtain the setting value. If the information about the MFP 104 is determined not to be used, steps S612 and S613 may be omitted.

In step S613, the MFP 104 receiving the instruction for calling the MFP data transmits the information corresponding to the setting value to the relay server 103. For example, if the MFP 104 receives a call for MFP data on "cassette sheet" and A4 sheets are set in the cassette, the MFP 104 returns a setting value of A4 to the relay server 103.

In step S614, the relay server 103 analyzes the print setting by using the called advance print setting or print setting and the obtained information about the MFP 104 (print setting analysis). More specifically, the relay server 103 determines whether the setting values for generating print data have all been obtained. If all the setting values have been obtained, the processing proceeds to print data generation processing of step S617. On the other hand, if there is an unknown setting value or values in the setting items of the advance print setting, the processing proceeds to print setting value inquiry processing of step S615 for user inquiry.

For example, suppose that the document print setting 803 of the service account A2 is called. The document print setting 803 includes a setting item "the number of copies" that has a setting value "inquire each time". Since such a value is not listed in the setting values 902 of the setting item 901 "the number of copies" in FIG. 9, the relay server 103 generates message data for inquiring the setting value from the user. The message data may include contents for directly inquiring a specific value from the user, such as "How many copies?", or contents for presenting choices and inquiring a value, such as "Select the number of copies from one to ten".

In step S615, the relay server 103 issues a print setting inquiry notification to the management server 102 (print setting value inquiry processing). More specifically, the relay server 103 transmits message data generated based on a result of the print setting analysis to the management server 102.

In step S616, the management server 102 receiving the message data transmits voice data based on the message data to the voice control device 101.

The voice control device 101 outputs voice for inquiring the print setting (for example, voice for inquiring the number of copies) based on the received voice data. The user who hears the voice speaks a desired print setting (e.g., value of the number of copies) based on the inquiry. If the voice control device 101 accepts the user's voice related to the print setting, the processing proceeds to the voice data transmission processing of step S609. In other words, the processing of steps S609 to S616 (framed procedure in FIG. 6) is repeated until all the setting values have been obtained. In step S614, if it is determined that all the setting values for generating print data have been obtained, the processing proceeds to the print data generation processing of step S617.

In step S617, the relay server 103 generates print data based on the setting values obtained as the result of the print setting analysis in step S614 and the image data obtained in step S606 (print data generation processing). The print data may be generated by another external apparatus (server). More specifically, the relay server 103 may identify the image data to be printed, call the print setting, and simply transmit the identified image data and the called print setting to another server. Then, the other server may generate the print data based on the received image data and print setting.

In step S618, the relay server 103 transmits the generated print data to the MFP 104. In step S619, after the transmission of the print data in step S618, the relay server 103 transmits a print data transmission completion notification to the management server 102. More specifically, the relay server 103 generates message data for notifying the user of the transmission of the print data to the MFP 104, and transmits the message data to the management server 102. If the print data is generated by a server other than the relay server 103, the other server may transmit the print data to the MFP 104. The relay server 103 may once receive the print data from the other server and then transmit the print data to the MFP 104.

In step S620, the management server 102 receives the print data transmission completion notification, and generates voice data based on the message data. Then, the management server 102 transmits the voice data to the voice control device 101.

As described above, the control system 100 according to the present exemplary embodiment identifies an account that is user information associated with a user's voice data based on the voice data, and obtains print settings associated with the identified account. Since the user's favorite print setting (advance print setting) can be previously registered in the account, print data is generated using the favorite print setting by the user simply giving an instruction by voice. This improves the operability of giving the print instruction.
[Processing Sequence for Registering Advance Print Setting]

Figure 13:
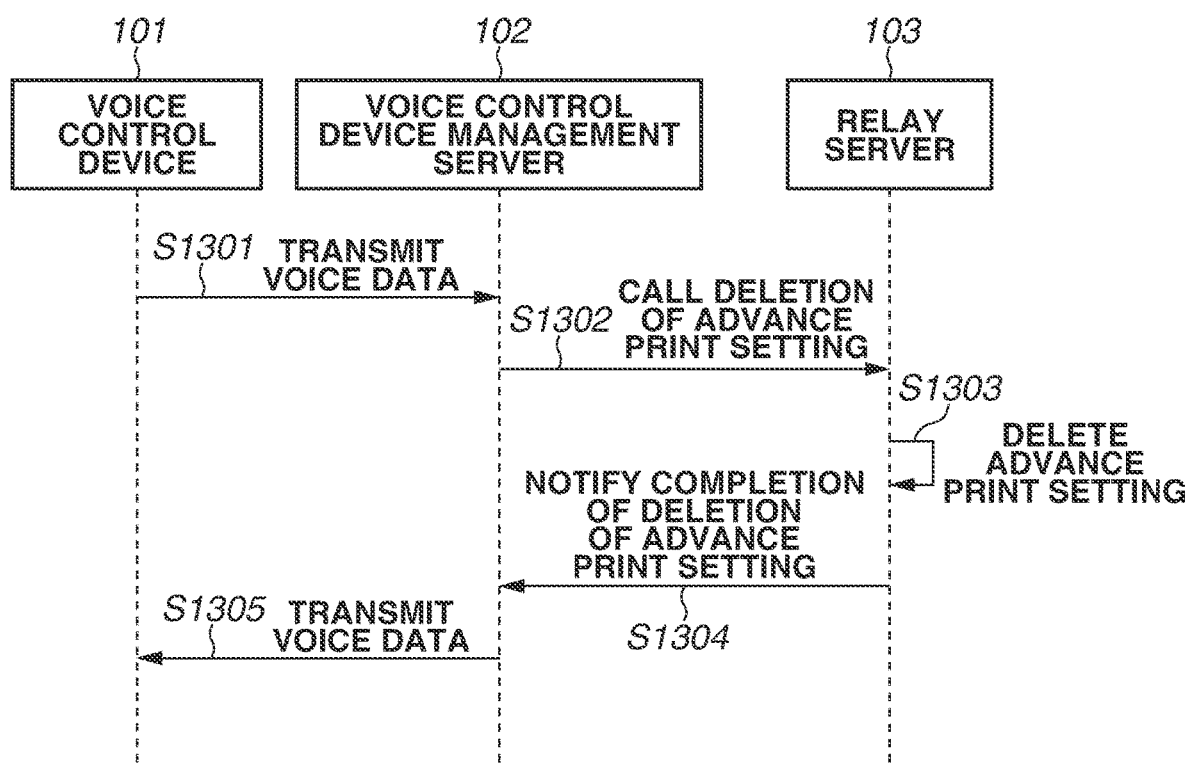
FIG. 13 is a sequence diagram illustrating processing for deleting the advance print setting.

Next, a method for registering a print setting in association with an account as an advance print setting will be described. An operation flow for registering the advance print setting by using the voice control device 101 based on a user's voice instruction will be described below with reference to FIGS. 10, 12, and 13. The processing performed by the apparatuses in the present sequence is implemented by the CPU of each of the apparatuses executing a program stored in the ROM of each of the apparatuses.

Figure 10:
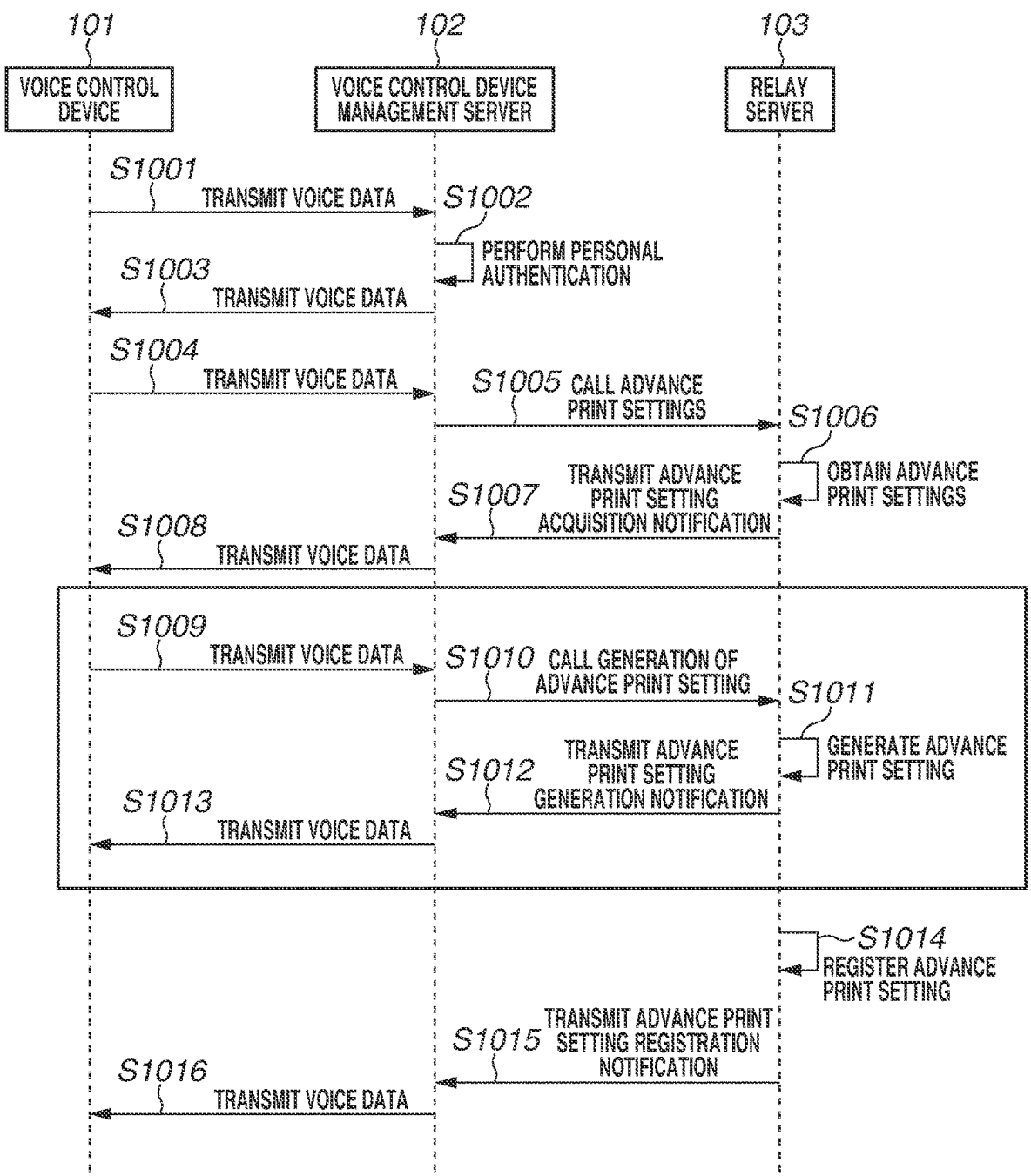
FIG. 10 is a sequence diagram illustrating processing for registering a new advance print setting.

Before the sequence of FIG. 10, first, the user says the wake word that is a predetermined keyword, and then says what the user wants to do. For example, the user speaks "Register an advance print setting" after the wake word.

In step S1001, the voice control device 101 receives a voice of the wake word and receives a subsequently spoken voice. More specifically, the voice control device 101 receives "Register an advance print setting" and transmits the voice data to the management server 102.

In step S1002, the management server 102 performs personal authentication on the received voice data. In the personal authentication, first, the management server 102 identifies the management account based on the voice data output from the voice control device 101. Then the management server 102 refers to the management database illustrated in FIG. 7 to determine whether a service account associated with the identified management account is registered. If there is the service account associated with the management account, the management server 102 calls the associated service account as one corresponding to the obtained voice data. More specifically, if the management server 102 obtains the voice data of user A, the management server 102 identifies the management account A1 corresponding to the voice data of user A, and further identifies the service account A2 associated with the management account A1. Thus, the management server 102 can call the service account A2 based on the voice data of user A.

If there is no management account corresponding to the obtained voice data (i.e., the management account corresponding to the voice data is not identified), the management server 102 may recognize the management account to be a default account. In FIG. 7, the default management account is associated with the service account C. Thus, for unregistered voice data, the management server 102 calls the service account C.

By the above-described processing, the personal authentication on the voice data is performed. While voice data is also obtained at subsequent utterance timings (steps S1004 and S1009), the personal authentication based on such voice data is not performed in the present exemplary embodiment. In other words, the service account authenticated in step S1002 is applied, and instructions are recognized as those from the service account. However, the personal authentication may be performed for each utterance.

In step S1003, the management server 102 generates voice data taking into account the result of the personal authentication in step S1002, and transmits the voice data to the voice control device 101. For example, if the service account A2 that is the service account of user A is called by the personal authentication in step S1002, the management server 102 may cause the voice control device 101 to reproduce a notification that the personal authentication is completed on the service account of the print service, such as "User A's account is linked". The management server 102 may transmit voice data for reproducing a notification prompting the user's next voice instruction. The management server 102 may cause the voice control device 101 to reproduce both the notification of the completion of the personal authentication and the notification prompting the user's next voice instruction. For example, the user's voice input may be prompted, such as "User A's account is linked. Advance print setting management is in process, and print settings can be newly registered, edited, and deleted. How can I help you?". If the management account is not identified in step S1002, the management account is handled as being a default account, and voice data conveying that the personal authentication on the management account has failed, such as "A default account is linked", may be transmitted. If the management account is the default account, association with the service account C corresponding to the default account may be notified.

In step S1004, the voice control device 101 receives an utterance related to any one of new registration, editing, and deletion of the advance print setting from the user, and transmits the voice data to the management server 102. For example, if the user wants to register a new advance print setting, the user can issue a voice instruction related to the new registration, such as "Register a new advance print setting". Alternatively, the user may make an utterance including a new setting name and print setting to be registered, such as "Register a new advance print setting. Photography print setting. Sheet size, A4. Sheet type, glossy paper". If the user wants to edit the advance print setting, the user can make an utterance related to editing, such as "Edit the advance print setting". Alternatively, the user can make an utterance including the specification of the advance print setting and the print setting item or items to be edited, such as "Edit the photography print setting. Change the sheet size to A4, and change the sheet type to glossy paper". If the user wants to delete the advance print setting, the user can make an utterance related to deletion, such as "Delete the advance print setting". The user can make an utterance to specify the advance print setting and delete the advance print setting, such as "Delete the advance print setting 'photography print setting'".

In step S1005, the management server 102 calls the advance print settings registered in the service account based on the identified service account. For example, suppose that the management server 102 identifies the management account A1, and identifies the associated service account A2. In such a case, the management server 102 transmits an instruction for calling the information about the advance print settings registered in the service account A2 to the relay server 103. The instruction for calling the advance print settings may include the information about the identified service account.

In step S1006, the relay server 103 receiving the instruction for calling the advance print settings obtains the advance print settings registered in the service account based on the obtained service account. The relay server 103 here may obtain all or part of the advance print settings registered in the service account.

If the service account is one having high authority, such as an account with administrator authority, the relay server 103 may obtain information about advance print settings registered in other service accounts.

For example, suppose that there are the service accounts A2, B2, and C as illustrated in FIG. 8, and the service account A2 is called. In such a case, the relay server 103 may obtain only the photography print settings 802, or all the advance print settings associated with the service account A2. If the service account A2 is an account with the administrator authority and the service accounts B2 and C are ones with standard user authority, the relay server 103 may also obtain the information about the advance print settings in the service accounts B2 and C when the service account A2 is called.

If an instruction for calling the advance print settings has been issued in the past and the advance print settings associated with the service account have been obtained, the relay server 103 does not need to obtain the advance print settings even if the instruction for calling the advance print settings is received.

In step S1007, the relay server 103 transmits an advance print setting acquisition notification to the management server 102 based on the result of the acquisition of the advance print settings. The advance print setting acquisition notification may include message data for conveying the result of the acquisition of the advance print settings to the user and message data for inquiring setting contents (setting items and setting values) to be registered. The advance print setting acquisition notification may include contents prompting the user's next utterance. The contents of the message data may be modified based on the contents of the voice data output in step S1001.

For example, suppose that the voice control device 101 outputs the voice data based on the user's utterance "Register a new advance print setting" in step S1001. In such a case, in step S1007, the relay server 103 generates message data for inquiring the setting contents to be registered. More specifically, the relay server 103 may generate message data for inquiring the setting items one by one in an interactive manner, such as "Tell me the setting name" and "Tell me the sheet size". The relay server 103 may generate message data for inquiring a plurality of setting items, such as "Tell me the print settings". If there is a plurality of predetermined templates, the relay server 103 may generate message data for making the user select one of the templates.

For example, suppose that the voice control device 101 outputs voice data based on the user's utterance "Edit the advance print setting" or "Delete the advance print setting" in step S1001. In such a case, in step S1007, the relay server 103 generates message data for inquiring the advance print setting to be edited or deleted. More specifically, the relay server 103 may generate message data "Select the advance print setting to be edited" or "Select the advance print setting to be deleted". If a database illustrated in FIG. 11 is registered, the relay server 103 may generate message data including utterance contents for making the user select the advance print setting to be edited or deleted from the database. For example, in the case of the service account A2, the relay server 103 may generate message data for making the user utter a choice, such as "Select one from the photography print setting, the document print setting, and the print setting W". The relay server 103 may generate message data for inquiring the setting name, such as "Tell me the advance setting name", or message data for inquiring both the setting name and the setting item, such as "Tell me the advance setting name and the setting item". If there is no advance print setting registered in the obtained service account as a result of step S1006, the relay server 103 can generate message data for notifying the user that there is no advance print setting registered. The relay server 103 may also generate, for example, message data including contents for conveying, to the user, that the advance print settings are successfully obtained. More specifically, the message data may include the contents for uttering obtained account information, such as "The advance print settings of the service account A2 are successfully obtained". The message data may include contents for uttering the types or the number of obtained advance print settings, such as "There are two advance print settings: the photography print setting and the document print setting".

In step S1008, the management server 102 transmits the voice data of the message data to the voice control device 101 based on the received advance print setting acquisition notification. The voice control device 101 reproduces the message data generated by the relay server 103 as the advance print setting acquisition notification to the user by making a voice output based on the received voice data from the speaker 201.

Now, a procedure in the case where an instruction to register a new advance print setting has been received from the user (voice data related to the instruction for registering the new advance print setting is output in step S1001) will be described with reference to steps S1009 to S1013.

In step S1009, the voice control device 101 receives the contents of the utterance made by the user who has heard the voice data of the message data for inquiring the setting contents in step S1008, and transmits the voice data. More specifically, the voice control device 101 receives the voice instruction about the setting contents for registering the new advance print setting from the user, and transmits the voice data to the management server 102. For example, the voice control device 101 receives the voice instruction "The number of copies, one. Sheet size, postcard. Sheet type, postcard. Quality, fine. Two-sided printing, one-sided. Color, monochrome" from the user, and transmits the voice data based on the voice instruction.

In step S1010, based on the received voice data, the management server 102 transmits an instruction for calling generation of the advance print setting to the relay server 103. The management server 102 transmits the instruction for calling the generation of the advance print setting together with the information about the print setting included in the received user's voice data. For example, the management server 102 transmits setting values "number of copies: 1", "sheet size: postcard", "sheet type: postcard", "quality: fine", "two-sided print setting: one-sided printing", and "color setting: monochrome". The instruction for calling the generation of the advance print setting may include information about the service account identified in step S1002.

In step S1011, the relay server 103 receives the instruction for calling the generation of the advance print setting, and generates the advance print setting. For example, if the setting values "number of copies: 1", "sheet size: postcard", "sheet type: postcard", "quality: fine", "two-sided print setting: one-sided printing", and "color setting: monochrome" are received, the relay server 103 registers the setting values. Here, the relay server 103 determines whether the setting values of the setting items for registering the new advance print setting have all been obtained.

In step S1012, the relay server 103 repeats the above-described processing if it is determined that not all the setting values of the setting items for registering the new advance print setting have been obtained. More specifically, the relay server 103 transmits an advance print setting generation notification for inquiring the setting value from the user to the management server 102 until all the setting values of the setting items for registering the new advance print setting have been determined. The relay server 103 includes message data for inquiring the setting values of undetermined setting items into the advance print setting generation notification. For example, if the setting name is not yet determined, the relay server 103 generates message data "Tell me the setting name".

In step S1013, the management server 102 receives the advance print setting generation notification, and transmits voice data for inquiring the undetermined setting item from the user to the voice control device 101. Since the subsequent processing is like that of step S1009 and the subsequent steps, redundant description thereof will be omitted. Steps S1009 to S1013 are performed until the setting values of the setting items for registering the new advance print setting are all determined.

If all the setting values of the setting items for registering the new advance print setting are determined, the processing proceeds to processing for registering the advance print setting in step S1014. More specifically, the relay server 103 registers the obtained print settings in association with the service account.

If the service account has high authority such as the administrator authority, new advance print settings of other service accounts can also be registered.

In step S1015, the relay server 103 may transmit an advance print setting registration notification after the processing for registering the advance print setting is performed. The advance print setting registration notification may include message data for conveying completion of the registration to the user.

In step S1016, the management server 102 transmits voice data based on the received advance print setting registration notification to the voice control device 101. The voice control device 101 reproduces the advance print setting registration notification to the user by outputting a message based on the received voice data by voice from the speaker 201. The advance print setting registration notification may include contents conveying the completion of registration of the advance print setting to the user, or if the registration has failed, may include contents conveying failure of the registration.

By such a sequence, the advance print setting can be registered as the favorite setting in each of the service accounts.

In the above description, a procedure for registering the new advance print setting is described as the processing of and after step S1009. However, in the present exemplary embodiment, the advance print setting not only can be newly registered but also can be edited. A procedure for editing the advance print setting will be described below.

Suppose that the user gives an utterance related to editing of the advance print setting at either of the timings before step S1001 and after step S1003. In such a case, in step S1007, the relay server 103 transmits message data for inquiring the advance print setting to be edited. Then, the voice control device 101 makes a voice output based on the message data, and the processing enters the procedure for editing the advance print setting illustrated in FIG. 12. For example, in step S1008, the voice control device 101 receives voice data for inquiring an advance setting name (setting name) from the management server 102, and outputs a message by voice.

In step S1201, after the voice output by the voice control device 101, the voice control device 101 receives the user's utterance including the advance setting name, and transmits voice data based on contents of the utterance.

In step S1202, the management server 102 transmits an instruction for calling editing of the advance print setting to the relay server 103 based on the received voice data.

In step S1203, the relay server 103 receives the instruction for calling the editing of the advance print setting, and performs processing for editing the advance print setting. For example, suppose that the user of the service account A2 speaks "Change the sheet size of the print setting W to A4" before step S1201. In such a case, the relay server 103 calls the print setting W associated with the service account A2 (print setting W 804 in FIG. 8). Then, the relay server 103 rewrites the setting value of the sheet size in the called print setting W from "postcard" to "A4", and stores the resulting print setting W.

In step S1204, the relay server 103 transmits message data notifying the management server 102 of completion of the editing of the advance print setting. In step S1205, the management server 102 transmits voice data based on the received message data to the voice control device 101.

By such a sequence, the advance print setting registered in each of the service accounts can be edited.

In the present exemplary embodiment, the advance print setting can also be deleted. A procedure for deleting the advance print setting will be described below.

Suppose that the user gives an utterance related to deletion of the advance print setting at either of the timings before step S1001 and after step S1003. In such a case, in step S1007, the relay server 103 transmits message data for inquiring the advance print setting to be deleted. Then, the voice control device 101 makes a voice output based on the message data, and the processing enters the procedure for deleting the advance print setting illustrated in FIG. 13. For example, in step S1008, the voice control device 101 receives voice data for inquiring the advance setting name from the management server 102, and outputs a message by voice.

In step S1301, after the voice output by the voice control device 101, the voice control device 101 receives the user's utterance including the advance setting name, and transmits voice data based on the contents of the utterance.

In step S1302, the management server 102 transmits an instruction for calling deletion of the advance print setting to the relay server 103 based on the received voice data.

In step S1303, the relay server 103 receives the instruction for calling the deletion of the advance print setting, and performs processing for deleting the advance print setting. For example, suppose that the user of the service account A2 speaks "Delete the print setting W" before step S1301. In such a case, the relay server 103 calls the print setting W associated with the service account A2 (print setting W 804 in FIG. 8). Then, the relay server 103 deletes the called print setting W.

In step S1304, the relay server 103 transmits message data notifying the management server 102 of completion of the deletion of the advance print setting. In step S1305, the management server 102 transmits voice data based on the received message data to the voice control device 101.

By such a sequence, the advance print setting registered in each of the service accounts can be deleted.

As described above, the control system 100 according to the present exemplary embodiment can identify the account (user information) associated with the user's voice data based on the voice data, and register the print setting in association with the identified account. Registering the user's favorite print setting (advance print setting) in advance improves the operability of giving the print instruction.

The control system 100 according to the present exemplary embodiment can also edit and delete the print setting registered in association with the account.

In the above-described exemplary embodiment, the voice control device 101 is described by using a smart speaker as an example. However, a function of the voice control device 101 can be implemented by the terminal apparatus 105 such as a smartphone. More specifically, the terminal apparatus 105 can function as the voice control device 101 by using the voice control application of the terminal apparatus 105.

In such a case, the terminal apparatus 105 can be said to be the voice control device 101 since the controls performed by the above-described voice control device 101 are implemented by the terminal apparatus 105.

In the above-described exemplary embodiment, the management server 102 registers one management account (and one service account) in association with voice data of one user. However, one management account (and one service account) may be associated with voice data of a plurality of users. For example, one management account (and one service account) may be associated with voice data of each of three members in a family.

In the above-described exemplary embodiment, one service account is described to be associated with one management account. However, one service account may be associated with a plurality of management accounts.

In the above-described exemplary embodiment, the account is used as the user information. However, in another exemplary embodiment, other user information may be used. In other words, while in the above-described exemplary embodiment, the account is associated with the voice data and the advance print setting is registered in association with the account, the account does not need to be used for implementation. For example, user identification information may be registered as the user information for each piece of voice data, and the advance print setting may be registered in association with each piece of user information registered.

In the above-described exemplary embodiment, the advance print setting is registered, edited, and deleted by a voice operation. However, the advance print setting may also be registered, edited, and deleted by a method other than the voice operation. For example, the registration, editing, and deletion can be implemented by a touch operation using the display unit 210 of the voice control device 101. The terminal apparatus 105 such as a smartphone may also be used for implementation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present disclosure, the operability of giving the print instruction can be improved.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036833, filed Feb. 28, 2019, which is hereby incorporated by reference herein in its entirety.

What is claimed is:

1. A control system comprising:
at least one server; and
a printing apparatus,
wherein the at least one server includes at least one processor and at least one memory which stores a set of instructions, the instructions when executed by the processor, causing the at least one server to act as:
an identification unit configured to, in a case where a voice control device is given a print instruction by voice, identify image data to be printed based on voice data output from the voice control device, and
a call unit configured to, based on user information identified based on voice data output from the voice control device, call a print setting associated with the identified user information,
wherein print data is generated based on the image data identified by the identification unit and the print setting called by the call unit, and
wherein the printing apparatus is configured to perform printing based on the print data generated.

2. The control system according to claim 1,
wherein the user information corresponds to a service account of a print service, and
wherein the service account is associated with a management account of a user identified based on the voice data output from the voice control device.

3. The control system according to claim 2, wherein the execution by the processor, further causing the at least one server to act as:
a control unit configured to store the service account and the print setting into a storage unit in association with each other based on an instruction from the user.

4. The control system according to claim 3, wherein the control unit is configured to associate a plurality of print settings with one service account.

5. The control system according to claim 1, wherein the call unit is configured to, in a case where the user information identified is a first service account, call a first print setting associated with the first service account, and in a case where the user information identified is a second service account, call a second print setting associated with the second service account.

6. A server system comprising at least one server,
wherein the at least one server includes at least one processor and at least one memory which stores a set of instructions, the instructions when executed by the processor, causing the at least one server to act as:
an identification unit configured to, in a case where a voice control device is given a print instruction by voice, identify image data to be printed based on voice data output from the voice control device, and
a call unit configured to, based on user information identified based on voice data output from the voice control device, call a print setting associated with the user information identified.

7. The server system according to claim 6,
wherein the user information corresponds to a service account of a print service, and
wherein the service account is associated with a management account of a user identified based on the voice data output from the voice control device.

8. The server system according to claim 7, wherein the execution by the processor, further causing the at least one server further to act as:
a control unit configured to store the service account and the print setting into a storage unit in association with each other based on an instruction from the user.

9. The server system according to claim 8, wherein the control unit is configured to associate a plurality of print settings with one service account.

10. The server system according to claim 6, wherein the call unit is configured to, in a case where the user information identified is a first service account, call a first print setting associated with the first service account, and in a case where the user information identified is a second service account, call a second print setting associated with the second service account.

11. A voice control printing system comprising:
a voice control device;
at least one server; and
a printing apparatus,
wherein the voice control device outputs voice data in a case where the voice control device is given a print instruction by voice,
wherein the at least one server includes at least one processor and at least one memory which stores a set of instructions, the instructions when executed by the processor, causing the at least one server to act as:
an identification unit configured to identify image data to be printed based on voice data output from the voice control device, and
a call unit configured to, based on user information identified based on voice data output from the voice control device, call a print setting associated with the identified user information,
wherein print data is generated based on the image data identified by the identification unit and the print setting called by the call unit, and
wherein the printing apparatus is configured to perform printing based on the print data generated.

12. The voice control printing system according to claim 11,
wherein the user information corresponds to a service account of a print service, and
wherein the service account is associated with a management account of a user identified based on the voice data output from the voice control device.

13. The voice control printing system according to claim 12, wherein the execution by the processor, further causing the at least one server to act as:
a control unit configured to store the service account and the print setting into a storage unit in association with each other based on an instruction from the user.

14. The voice control printing system according to claim 13, wherein the control unit is configured to associate a plurality of print settings with one service account.

15. The voice control printing system according to claim 11, wherein the call unit is configured to, in a case where the user information identified is a first service account, call a first print setting associated with the first service account, and in a case where the user information identified is a second service account, call a second print setting associated with the second service account.

* * * * *